United States Patent
Liu et al.

(10) Patent No.: US 8,054,419 B2
(45) Date of Patent: Nov. 8, 2011

(54) DISPLAY DEVICE AND DISPLAY PANEL AND COLOR FILTER THEREOF

(75) Inventors: Yun-I Liu, Hsin-Chu (TW); Sheng-Wen Cheng, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 274 days.

(21) Appl. No.: 12/408,103

(22) Filed: Mar. 20, 2009

(65) Prior Publication Data

US 2010/0171910 A1 Jul. 8, 2010

(30) Foreign Application Priority Data

Jan. 8, 2009 (TW) .............................. 98100519 A (51) Int. Cl.
*G02F 1/1335* (2006.01)
*H05B 33/02* (2006.01)
(52) U.S. Cl. ........................................ 349/106; 313/112
(58) Field of Classification Search ........................ None
See application file for complete search history.

(56) References Cited

U.S. PATENT DOCUMENTS

| 6,714,243 | B1 * | 3/2004 | Mathur et al. | 348/273 |
| 7,602,119 | B2 * | 10/2009 | Miller et al. | 313/506 |
| 2005/0218768 | A1 * | 10/2005 | Saito | 313/112 |
| 2005/0236950 | A1 * | 10/2005 | Maeda et al. | 313/112 |
| 2007/0195231 | A1 * | 8/2007 | Kuribayashi et al. | 349/106 |
| 2007/0268429 | A1 * | 11/2007 | So | 349/106 |
| 2009/0002858 | A1 * | 1/2009 | Okutsu et al. | 359/891 |

* cited by examiner

*Primary Examiner* — Tina Wong
(74) *Attorney, Agent, or Firm* — Chun-Ming Shih (57) ABSTRACT

A display device and a display panel and a color filter thereof are provided. The color filter includes a transparent substrate, at least a red filter film, at least a green filter film, at least a plurality of blue filter film and at least a white filter film. The red filter films, the green filter films, the blue filter films and the white filter films are disposed on the transparent substrate. The blue filter films have a first largest transmittance when a light with first wavelength transmits it. The green filter films have a second largest transmittance when a light with second wavelength transmits it. The white filter films have a third largest transmittance when a light with third wavelength transmits it. The third largest transmittance is larger than the first largest transmittance and the second largest transmittance. The third wavelength is between the first wavelength and the second wavelength. Therefore, the images displayed by the display device with the color filter may have accurate color-level and high brightness.

17 Claims, 6 Drawing Sheets

DISPLAY DEVICE AND DISPLAY PANEL AND COLOR FILTER THEREOF

This application claims priority to a Taiwan application No. 098100519 filed Jan. 8, 2009.

BACKGROUND

1. Field of the Invention

The invention relates to a display device, and more particularly, to a display device with four colors filter films and a display panel and a color filter thereof.

2. Description of the Related Art

Recently, the technology of displaying focuses on the flat panel display. Since the flat panel display regardless of liquid crystal display (so-called LCD), plasma display panel (so-called PDP) or organic electro-luminescent display (so-called OELD) have the features of light weight, thin thickness, small volume, low energy and power consumption and almost without radiation injuries, the consuming margin of the flat panel display in the information market is very astonishing.

For chromatic flat panel display, a color filter is usually used for achieving the efficacy of colorizing the image displayed thereby. Although the conventional color filter comprises red filter films, green filter films and blue filter films, the color filter with multi-colors is developed and researched because of the needs of the chromatic brightness and the chromatic saturation is getting higher. Moreover, the color filter with four colors (red, green, blue and white) having the features of increasing brightness of displayed images and saving energy is developed and used popularly.

Figure 1:
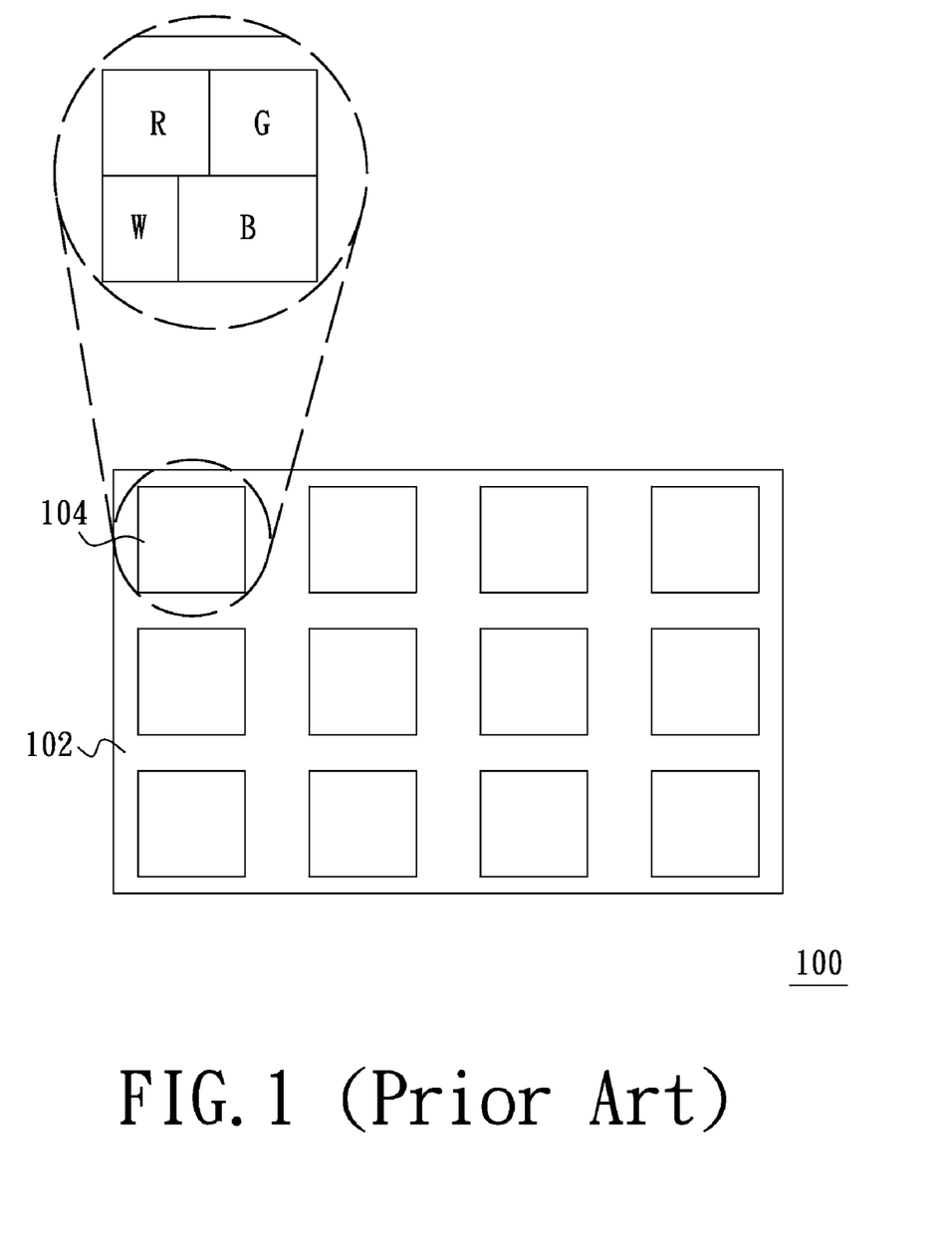
FIG. 1 is a diagram illustrating conventional color filter with four colors.

FIG. 1 is a diagram illustrating conventional color filter with four colors. Referring to FIG. 1, color filter 100 comprises a substrate 102 and a plurality of pixels 104 disposed on the substrate 102. Each pixel 104 comprises a red filter film R, a green filter film G, a blue filter film B and a filter film W.

Since the color level of the white filter film W slants towards yellow, the area of the blue filter film B is increased in the color filter 100 to make the chromaticity coordinate of the white-light mixed by the lights transmitting from the red filter film R, the green filter film G, the blue filter film B and the white filter film W close to the chromaticity coordinate of the white-light mixed by the lights transmitting from the red filter film R, the green filter film G and the blue filter film B.

However, if the area of the blue filter film B is increased without changing the area of the pixel 104, it is necessary to decrease the area of the white filter film W. Thus, the transmittance of the color filter 100 would be decreased so that the brightness of the images displayed by the display device cannot be enhanced.

BRIEF SUMMARY

Therefore, the invention provides a color filter with high transmittance and low color mismatched.

The invention also provides a display panel to display images with high transmittance and low color mismatched.

The invention further provides a display device for displaying images with high brightness without affecting the color levels of the images and increasing consumed power.

The invention provides a color filter comprising a transparent substrate, at least a red filter film, at least a blue filter film, at least a green filter film and at least a white filter film. The red filter film, blue filter film, green filter film and white filter film are disposed on the transparent substrate. The blue filter film has a first curve in a transmittance coordinate system and the first curve has a first largest transmittance at a first wavelength in the transmittance coordinate system, the green filter film has a second curve in a transmittance coordinate system and the second curve has a second largest transmittance at a second wavelength in the transmittance coordinate system, and the white filter film has a third curve in a transmittance coordinate system and the third curve has a third largest transmittance at a third wavelength in the transmittance coordinate system. Moreover, the third wavelength is between the first wavelength and the second wavelength, and the third largest transmittance is larger than the first largest transmittance and the second largest transmittance.

The invention provides a display panel comprising a first substrate, the aforementioned color filter and a display medium layer. The color filter is disposed above the first substrate and the display medium layer is disposed between the first substrate and the color filter.

The invention provides a display device comprising the aforementioned display panel and a back light module. The back light module comprises a light source for providing a light. The display panel is disposed above the back light module.

In one embodiment of the invention, the first wavelength is 460 nm.

In one embodiment of the invention, the second wavelength is 530 nm.

In one embodiment of the invention, the white filter films are doped with cyan pigment.

In one embodiment of the invention, the lights transmitting from the red filter film, the green filter film and the blue filter film are mixed to a white mixing-light, the difference of absolutely chromaticity coordinate values between the white mixing-light and the light transmitting the white filter film is smaller than 0.003.

In one embodiment of the invention, the display medium layer of the display panel is a liquid crystal layer.

In one embodiment of the invention, the first substrate of the display panel is an active elements array substrate.

In one embodiment of the invention, the integral of the first curve, second curve and third curve, in the interval from the first wavelength to the second wavelength, have a first integrating value, a second integrating value and a third integrating value respectively. The third integrating value is larger than 0.7 times the summation of the first integrating value and the second integrating value.

In one embodiment of the invention, the light source of the display device comprises at least a cold cathode fluorescent lamp or a light emitting diode.

The problem of color mismatched of the color filter with four colors is solved in the invention through adjusting the relationship between the wavelength of the light transmitting from the white filter films and the transmittance thereof. Thus, the problem of color mismatched of the color filter with four colors may be solved without decreasing the area of the white filter films in the invention, and the images displayed by the display device with the color filter of the invention may have accurate color-level and high brightness at the same time.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

A non self-light-emitting display device is used as an embodiment for describing the color filter of the invention in the following paragraphs with the diagrams. Those skilled in the art should know that the color filter of the invention is adapted to be used in any colorable display device but not be limited hereto.

Figure 2:
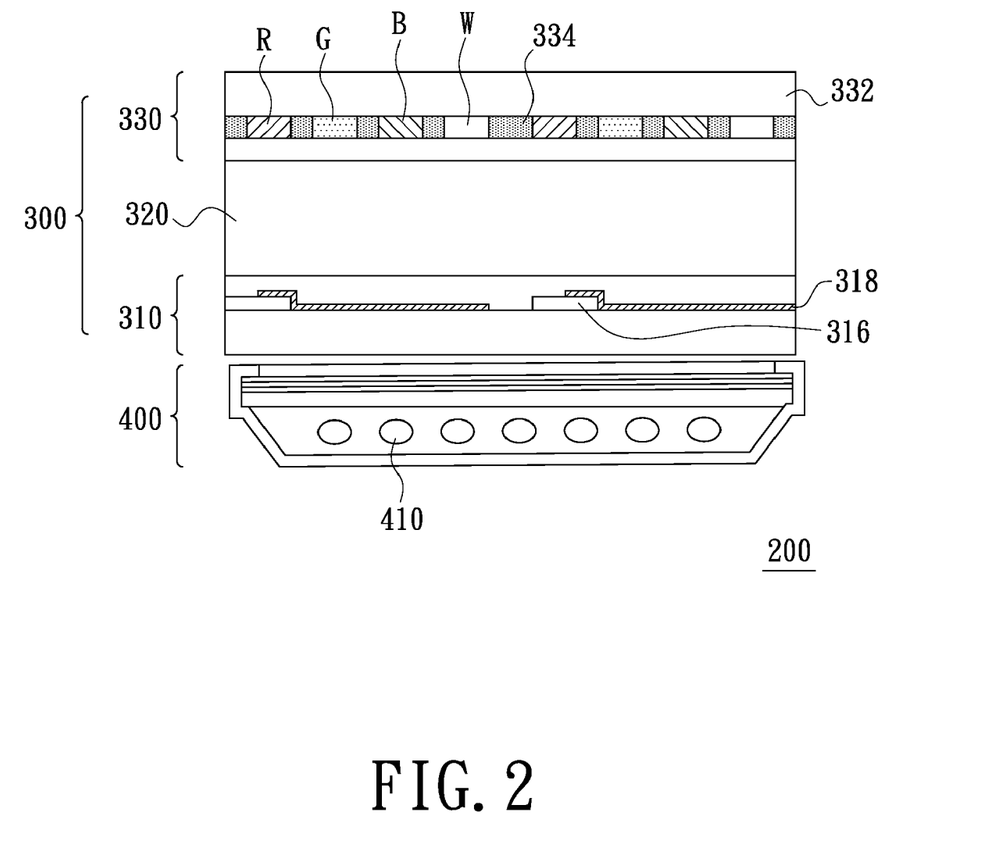
FIG. 2 is a cross-section diagram illustrating a display device in accordance with an embodiment of the invention.

FIG. 2 is a cross-section diagram illustrating a display device in accordance with an embodiment of the invention. Referring to FIG. 2, the display device 200 comprises a display panel 300 and a back light module 400. The back light module 400 comprises a light source 410 used for providing light. The display panel 300 is disposed above the back light module 400.

Figure 3:
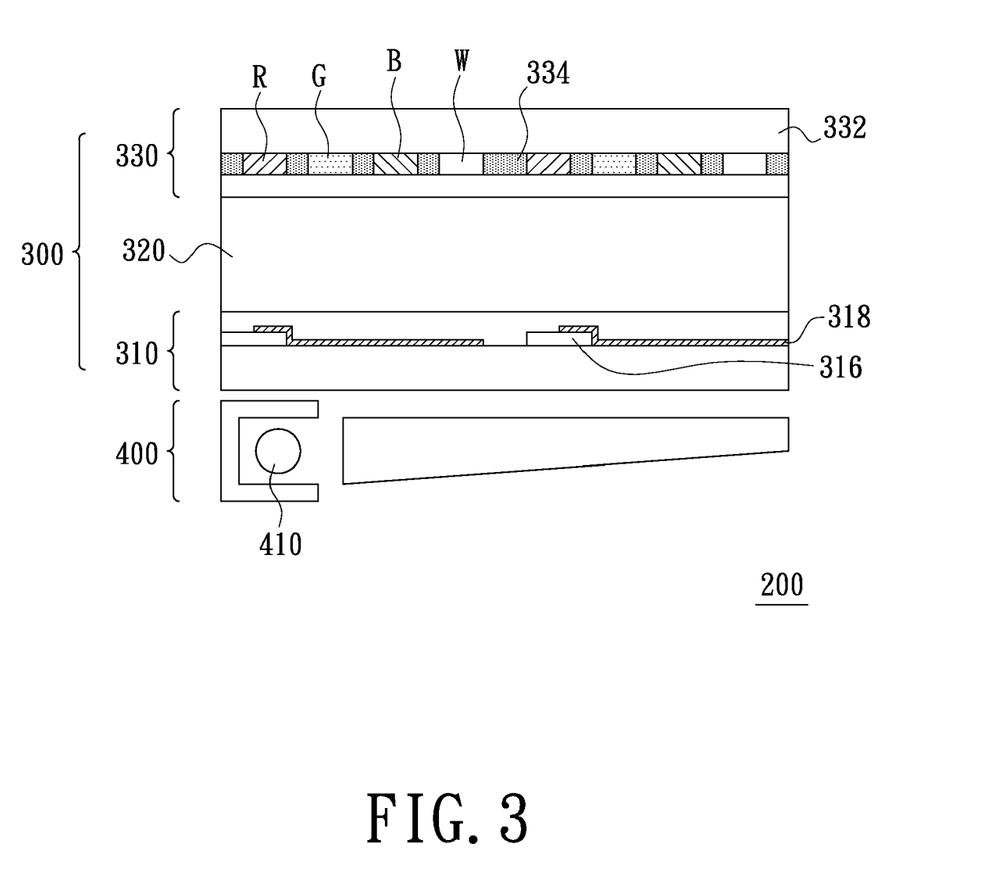
FIG. 3 is a cross-section diagram illustrating a display device in accordance with an embodiment of the invention.

It should be noted that the type of the back light module 400 is not limited hereto. For example, the back light module 400 may be direct type back light module as shown in FIG. 2 or side type back light module as shown in FIG. 3. Although a cold cathode fluorescent lamp is used as an example to describe the light source 410 of the back light module 400 herein, but the light source 410 used in the back light module 400 may also be light emitting diodes.

Referring to FIG. 2, the display panel 300 comprises a first substrate 310, a display medium layer 320 and a color filter 330. The color filter 330 is disposed above the first substrate 310 and the display medium layer 320 is disposed between the first substrate 310 and the color filter 330. In this embodiment, the display medium layer 320 is, for example, a liquid crystal layer but not limited hereto.

Figure 4:
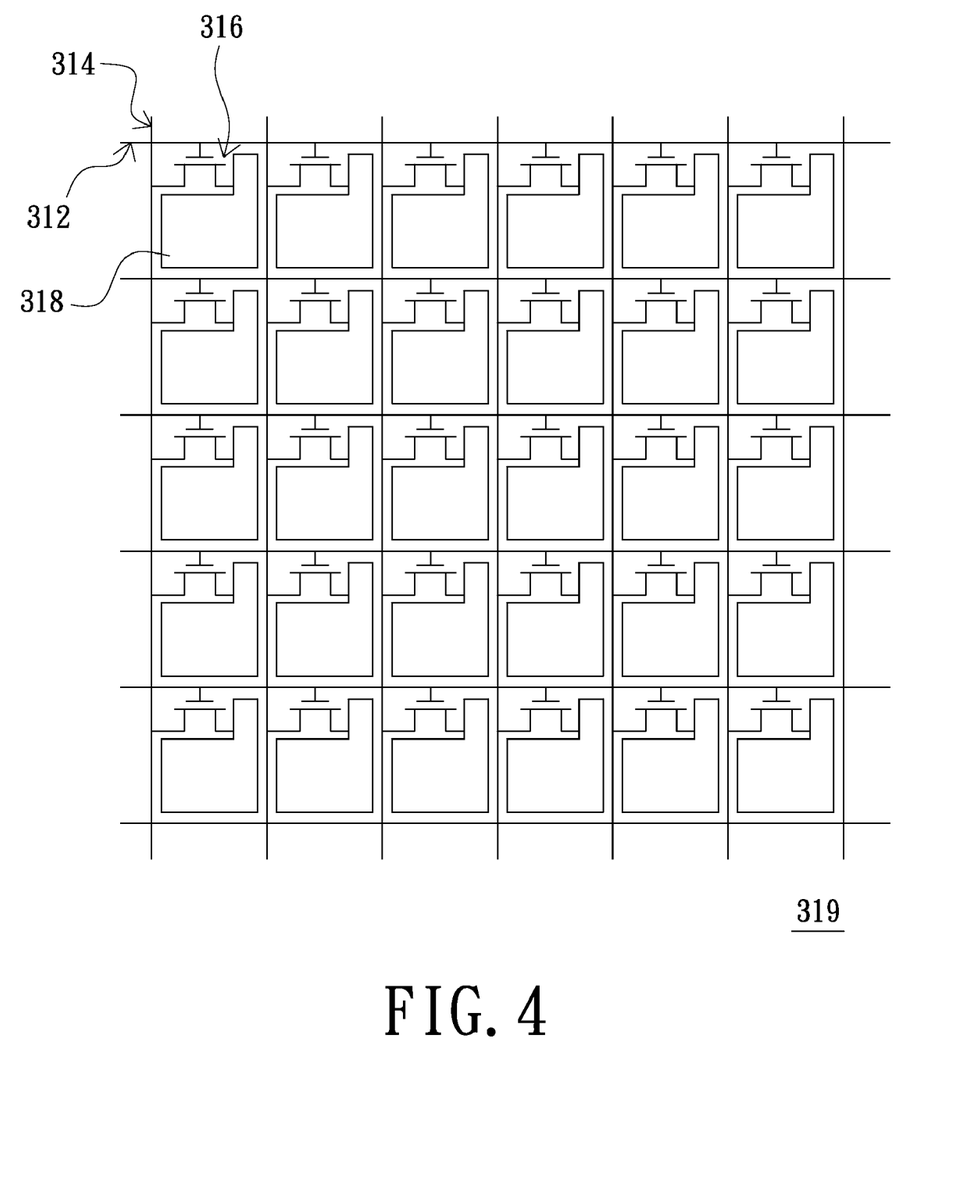
FIG. 4 is a diagram illustrating a first substrate of a display panel in accordance with an embodiment of the invention.

Specifically, the first substrate 310 is, for example an active elements array substrate, as shown in FIG. 4. An active elements array 319 comprising a plurality of scan lines 310, a plurality of data lines 314, a plurality of thin film transistors 316 and a plurality of pixel electrodes 318 is disposed on the first substrate 310. Each thin film transistor 316 is electrically connected with the corresponding scan line 312 and the corresponding data line 314. Each pixel electrode 318 is electrically connected to the data line 314 through the thin film transistor 316.

As shown in FIG. 2, the color filter 300 comprising a transparent substrate 332, at least a red filter film R, at least a green filter film G, at least a blue filter film B and at least a white filter film W is disposed above the first substrate 310. The red filter film R, the green filter film G, the blue filter film B and the white filter film W are all disposed on the transparent substrate 332 and located between the first substrate 310 and the transparent substrate 332. Furthermore, a light-shielding matrix 334 is disposed on the color filter 300 and between the adjacent filter films to improve the contrast of the display device 200.

Figure 5A:
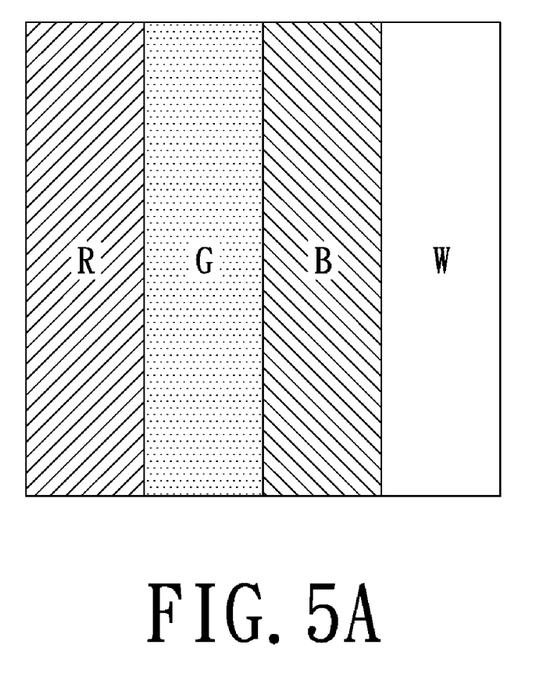
FIGS. 5A and 5B are diagrams respectively illustrating a portion of the color filter in accordance with different embodiments of the invention.
Figure 5B:
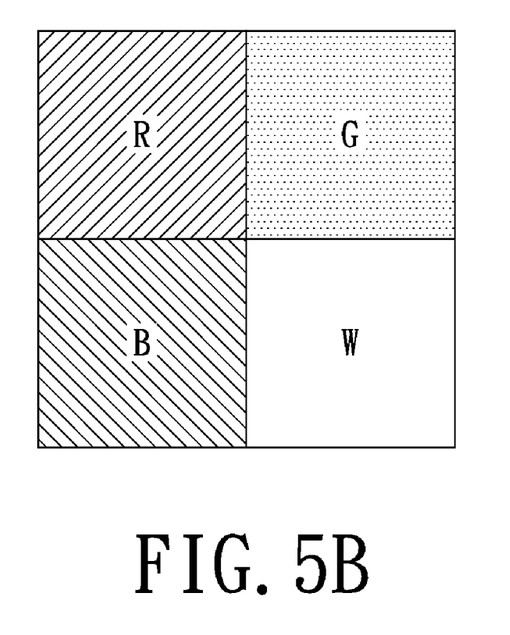

It should be noted that the areas of the red filter film R, the green filter film G, the blue filter film B and the white filter film W may be equal to each other, and the arrangement forms on the transparent substrate 332 thereof may be shown in FIG. 5A or FIG. 5B but not be limited hereto.

Figure 6:
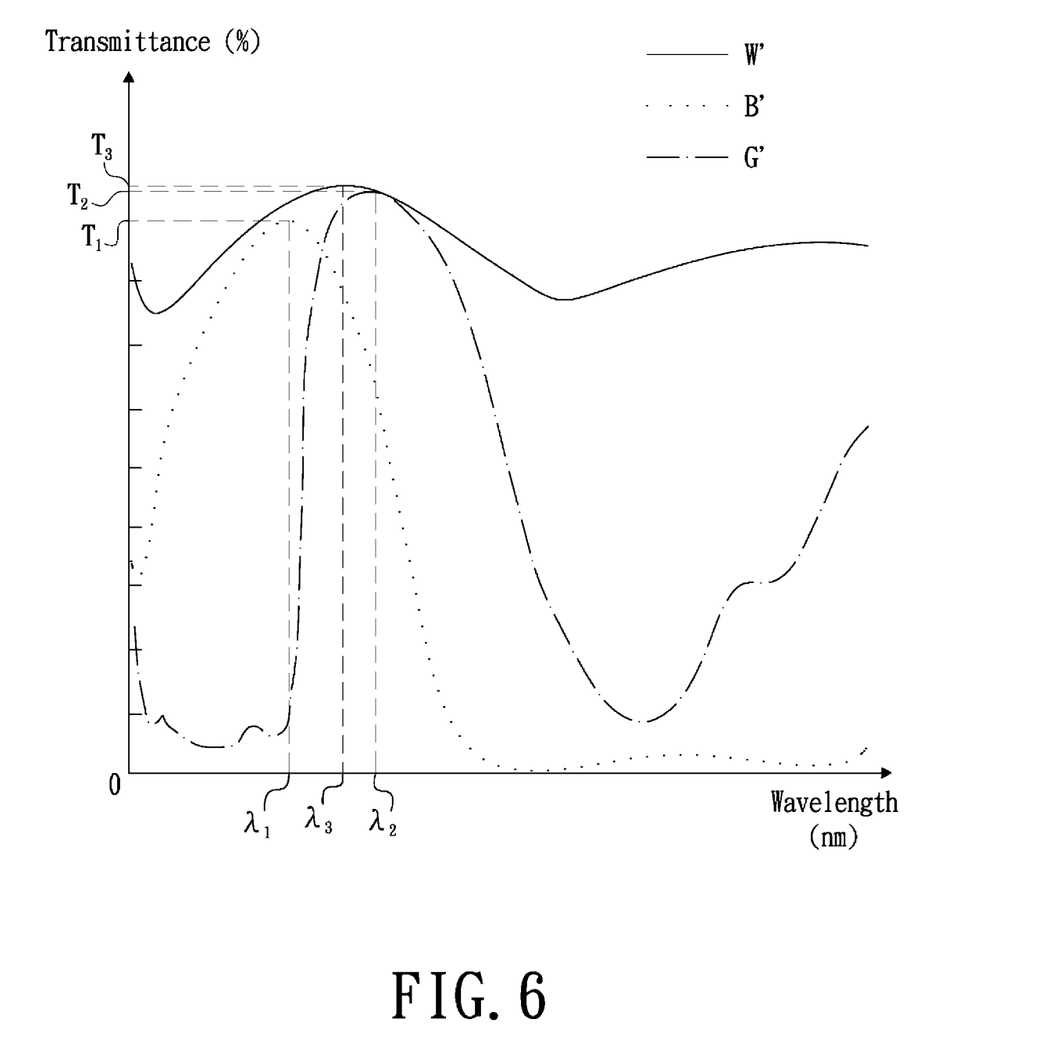
FIG. 6 is a diagram illustrating the curves of the blue filter film B, green filter film G and white filter film W of the color filter in a transmittance coordinate system of the invention.

FIG. 6 is a diagram illustrating the curves of the blue filter film B, green filter film G and white filter film W of the color filter in a transmittance coordinate system of the invention. Referring to FIG. 2 and FIG. 6, the blue filter film B has a first curve B' in the transmittance system, the green filter film G has a second curve G' in the transmittance system, the white filter film W has a third curve W' in the transmittance system.

As shown in FIG. 6, the first curve B' has a first largest transmittance $T_1$ at a first wavelength $\lambda_1$, the second curve G' has a second largest transmittance $T_2$ at a second wavelength $\lambda_2$ and the third curve W' has the third largest transmittance $T_3$ at a third wavelength $\lambda_3$ in the transmittance coordinate system. In other words, when the light with the first wavelength $\lambda_1$ transmits from the blue filter film B, the transmittance of the light has the first largest transmittance $T_1$. Similarly, when the light with the second wavelength $\lambda_2$ transmits from the green filter film G, the transmittance of the light has the second largest transmittance $T_2$. When the light with the third wavelength transmits from the filter film W, the transmittance of the light has the third largest transmittance $T_3$.

In this embodiment, the first wavelength $\lambda_1$ is, for example, 460 nm, the second wavelength $\lambda_2$ is, for example, 530 nm and the third wavelength $\lambda_3$ is between the first wavelength $\lambda_1$ and the second wavelength $\lambda_2$. Moreover, the third largest transmittance $T_3$ is larger than the first largest transmittance $T_1$ and the second largest transmittance $T_2$.

It should be noted that the transmittance of the white filter film W is satisfied with the curve W' shown in FIG. 6 by doping cyan pigment to the white filter film W.

Referring to FIG. 2 and FIG. 6 again, in the back light module 400 of the display device 200 of this embodiment, the integrating value of the spectrum BL of the light emitted from the light source 410 integrated with the transmittance $T_B$ of the blue filter film B between the first wavelength $\lambda_1$ and the second wavelength $\lambda_2$ is a first integrating value $C_1$, the integrating value of the spectrum BL integrated with the transmittance $T_G$ of the green filter film G between the first wavelength $\lambda_1$ and the second wavelength $\lambda_2$ is a second integrating value $C_2$ and the integrating value of the spectrum BL integrated with the transmittance $T_W$ of the white filter film W between the first wavelength $\lambda_1$ and the second wavelength $\lambda_2$ is a third integrating value $C_3$. The third integrating value $C_3$ is larger than 0.7 times the summation of the first integrating value $C_1$ and the second integrating value $C_2$. It may be represented in a mathematic formula such as $$\frac{\int_{\lambda_1}^{\lambda_2} T_W \times BL}{\int_{\lambda_1}^{\lambda_2} T_G \times BL + \int_{\lambda_1}^{\lambda_2} T_B \times BL} = \frac{C_3}{C_1 + C_2} > 0.70 \quad (1)$$

Specially, as the blue filter film B, the green filter film G and the white filter film W are matched with the formula (1), the difference of the chromaticity coordinates of the white light mixed by the lights transmitting from the red filter film R, the green filter film G and the blue filter film B and of the light transmitting from the white filter film W is small than 0.003 (the smallest value in the range recognizable for human eyes). Thus, the degree of the color mismatched of the color filter 300 is substantially decreased in the invention.

In summary, the problem of color mismatched of the color filter with four colors is solved in the invention through adjusting the relationship between the wavelength of the light transmitting from the each filter films and the transmittance thereof. Therefore, the color filter of the invention may have four colors filter films with the same area. In the other words, the problem of color mismatched of the color filter with four colors may be solved without decreasing the area of the white filter films in the invention, and the images displayed by the display device with the color filter of the invention may have accurate color-level and high brightness at the same time.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A color filter, comprising:
   a transparent substrate;
   at least a red filter film disposed on the transparent substrate;
   at least a blue filter film disposed on the transparent substrate, wherein a light with a first wavelength transmits from the blue filter film, the transmittance of the light has a first largest transmittance;
   at least a green filter film disposed on the transparent substrate, wherein a light with a second wavelength transmits from the green filter film, the transmittance of the light has a second largest transmittance; and
   at least a white filter film disposed on the transparent substrate, and the white filter film is doped with cyan pigment, wherein a light with third wavelength transmits from the white filter film, the transmittance of the light has a third largest transmittance, and wherein the third wavelength is between the first wavelength and the second wavelength, the third largest transmittance is larger than the first largest transmittance and the second largest transmittance.

2. The color filter of claim 1, wherein the first wavelength is 460 nm.

3. The color filter of claim 1, wherein the second wavelength is 530 nm.

4. The color filter of claim 1, wherein the lights transmitted from the red filter film, the green filter film and the blue filter film are mixed to a white mixing-light, the difference of the chromaticity coordinate between the white mixing-light and the light transmitting from the white filter film is smaller than 0.003.

5. A display panel, comprising:
   a first substrate;
   a color filter disposed on the first substrate comprising:
      a transparent substrate;
      at least a red filter film disposed on the transparent substrate and located between the first substrate and the transparent substrate;
      at least a blue filter film disposed on the transparent substrate and located between the first substrate and the transparent substrate, wherein a light with a first wavelength transmits from the blue filter film, the transmittance of the light has a largest transmittance;
      at least a green filter film disposed on the transparent substrate and located between the first substrate and the transparent substrate, wherein a light with a second wavelength transmits from the green filter film, the transmittance of the light has a second largest transmittance;
      at least a white filter film disposed on the transparent substrate and located between the first substrate and the transparent substrate, and the white filter film is doped with cyan pigment, wherein a light with third wavelength transmits from the white filter film, the transmittance of the light has a third largest transmittance, and wherein the third wavelength is between the first wavelength and the second wavelength, the third largest transmittance is larger than the first largest transmittance and the second largest transmittance; and
   a display medium layer disposed between the first substrate and the color filter.

6. The display panel of claim 5, wherein the first wavelength is 460 nm.

7. The display panel of claim 5, wherein the second wavelength is 530 nm.

8. The display panel of claim 5, wherein the lights transmitting from the red filter film, the green filter film and the blue filter film are mixed to a white mixing-light, the difference of the chromaticity coordinate between the white mixing-light and the light transmitting from the white filter film is smaller than 0.003.

9. The display panel of claim 5, wherein the first substrate is an active elements array substrate.

10. The display panel of claim 5, wherein the display medium layer is a liquid crystal layer.

11. A display device comprising:
    a back light module comprising a light source used for providing a light; and
    a display panel disposed above the back light module comprising:
       a first substrate;
       a color filter disposed above the first substrate comprising:
          a transparent substrate;
          at least a red filter film disposed on the transparent substrate and located between the first substrate and the transparent substrate;
          at least a blue filter film disposed on the transparent substrate and located between the first substrate and the transparent substrate, wherein the blue filter film has a first curve in a transmittance coordinate system and the light with a first largest wavelength transmits from the blue filter film, the transmittance of the light has a first largest transmittance in the transmittance coordinate system;
          at least a green filter film disposed on the transparent substrate and located between the first substrate and the transparent substrate, wherein the green filter film has a second curve in a transmittance coordinate system and the light with a second largest wavelength transmits from the green filter film, the transmittance of the light has a second largest transmittance in the transmittance coordinate system;
          at least a white filter film disposed on the transparent substrate and located between the first substrate and the transparent substrate, and the white filter film is doped with cyan pigment, wherein the white filter has a third curve in a transmittance coordinate system and the light with a third largest wavelength transmits from the white filter film, the transmittance of the light has a third largest transmittance in the transmittance coordinate system, and wherein the third wavelength is between the first wavelength and the second wavelength, and the third largest transmittance is larger than the first largest transmittance and the second largest transmittance; and a display medium layer disposed between the first substrate and the color filter.

12. The display device of claim 11, wherein the first wavelength is 460 nm.

13. The display device of claim 11, wherein the second wavelength is 530 nm.

14. The display device of claim 11, wherein the lights transmitting from the red filter film, the green filter film and the blue filter film are mixed to a white light, the difference of the chromaticity coordinate between the white light and the light transmitting from the white filter film is smaller than 0.003.

15. The display device of claim 11, wherein the integral of the first curve, second curve and third curve, in the interval from the first wavelength to the second wavelength, have a first integrating value, a second integrating value and a third integrating value respectively, and wherein the third integrating value is larger than 0.7 times the summation of the first integrating value and the second integrating value.

16. The display device of claim 11, wherein the display medium layer is a liquid crystal layer.

17. The display device of claim 11, wherein the light source comprises at least a cold cathode fluorescent lamp or a light emitting diode.

* * * * *